ANTHONY L. FLEURY, OF PHILADELPHIA, PENNSYLVANIA.

Letters Patent No. 61,931, dated February 12, 1867; antedated December 28, 1866.

IMPROVEMENT IN PREPARING SOLUBLE SILICA, AND IN APPLYING THE SAME TO USEFUL PURPOSES.

*The Schedule referred to in these Letters Patent and making part of the same.*

TO ALL WHOM IT MAY CONCERN:

Be it known that I, ANTHONY L. FLEURY, of the city and county of Philadelphia, in the State of Pennsylvania, have invented a new and valuable Improvement in the Process of Dissolving Quartz and Silicious Substances, and in using the hydrate of silica in the arts and manufacture in the way and for the purposes hereafter specified.

The nature of my invention consists in converting silica of quartz, or silicates, such as are found in nature, and such as have been produced artificially, into sulphide of silicium, by treating them in the way below more fully described, with sulphur or compounds of sulphur, and then to treat the sulphide of silicium with water or steam, whereby the sulphide is decomposed and the silicium converted into a hydrate of silica $SiO^3HO$, which is soluble in hot water, and is ready for use in the arts and manufacture, as below more fully described.

The solutions of silica in water, hitherto used in the arts, are mostly combinations of silica with an alkali, such as soda and potassa, and have been called waterglass, which alkaline solutions, when used for paint or for making of artificial stones, are easily decomposed by the carbonic acid of the atmosphere, and therefore not durable. Though several remedies have been invented to counteract this evil, such as the use of chloride of calcium, (in the Ransome process,) or of hydrofluoric acid, or of other such substances as form with the alkali an insoluble compound, still there is a yet great want of a neutral solution of silica, one that contains no alkali in its composition, and one that may be called a petrifying liquid, a true solution of opal or flint in water.

The liquid that is produced by the decomposition of sulphide of silicium by water or steam, such as I produce by my improved process, as below described, contains no alkali, and is therefore fit to be used in preference to alkaline silicates. The uses to which I put the solution of silica in water are the following:

1. As a cement for the production of marble, sand-stone, and other hard refractory concretes. Suitable materials, such as marble dust, sand, chalk, plaster, clay, lime, &c., are heated, and then mixed with the petrifying liquid, put into the requisite moulds, wherein they are left to dry. Artificial marble busts, statues, gravestones, mantle-pieces, ornaments, &c., as well as building-stones, and columns, and monuments, &c., can cheaply be made. They harden when exposed to the atmosphere, and do not crumble down.

2. As water and fire-proof coating for roofs, cellars, basements, vaults, sewers, &c. Shingles, when impregnated with the liquid silica, become fire and water-proof; the same takes place with canvas and other porous material. Bricks, heated above the boiling point of water, and dipped into the hot solution of silica, become stronger, and compact like stone.

3. As a base for the manufacture of fire and water-proof paint. Mixed with white lead, zinc white, baryta, ultramarine, oxides, and vegetable colors, paper, canvas, wood, and cloth can be painted over and made water and fire-proof. This liquid silica can also be admixed to glue or albumen, to starch paste, &c., and used for sizing and glazing paper or other textile fabrics.

4. As a preventive of decay for wood, which becomes rot, fire, and water-proof. Railroad sleepers, telegraph poles, ship and house-timber can be made durable and proof against decay and water by simply impregnating the wood with the liquid.

5. As a cementing material in the manufacture of millstones, polishing-wheels, whetstones, hones, razor-straps, scythe-rifles, and grindstones. For these purposes it is mixed with powdered franklinite ore, cinder from puddling furnaces, pumice-stone, emery, &c., moulded, and dried.

6. For embalming dead bodies, and covering and preserving meat, fruit, vegetables, birds, and animals of all kinds. As a neutral petrifying liquid it can be injected into the veins of a dead body and under its skin, whereby, the silica becoming insoluble, it prevents decomposition. Eggs covered with the liquid can be preserved for a long time.

7. As an admixture to coal dust, peat, &c., in the manufacture of artificial fuel, and as cement in general, alone or as admixture. This liquid is better adapted for this purpose, because it does not, like the alkaline solutions, so easily melt when exposed to high heat. This property makes it also adapted for the manufacture of stoves, crucibles, &c. In the manufacture of porcelain and glass, this hydrated silica solution can be employed in many ways; as lining for oil and alcohol barrels and tanks of any kind, for hardening porous materials, for varnish, &c., of water pipes made of wood or paper, for lining of safes.

A great many more applications might be mentioned; these, however, are sufficient to show the value of this petrifying liquid in the arts and manufacture. I will now proceed to describe the processes by which this hydrated silica is produced.

In order to enable others skilled in the arts to use my invention, and as the invention can be carried out in any glass factory, or be adapted to wherever in a furnace a white heat can be produced, I deem it not necessary to illustrate it by drawings and models.

I firstly take quartz in fine powder and mix it intimately with gas tar, or any other cheap hydrocarbon, and heat it up to a white heat. I then introduce, into the highly heated quartz, sulphur in a melted condition or as vapor. Carbonic oxide escapes, while sulphide of silicium as a white powder is formed. This is then poured into boiling water, or treated by steam, when the sulphide of silicium is decomposed, forming with the oxygen of the water silica $SiO^3$, while the hydrogen appropriating the sulphur passes off as sulphuretted hydrogen. The silica, finding no alkali to combine with, takes up some of the water as its substitute, forming a hydrate of silica soluble in water, which is neutral, and very like the chemical combination of the opal. Other methods for producing this liquid quartz can be used; for instance, bisulphide or sulphide of carbon can be passed into or over the heated quartz or silicates, which also decompose the quartz and form sulphide of silicium. In short, any sulphur combination that contains no oxygen can be used for the purpose.

I do not claim the preparation of sulphide of silicium as it is prepared on a small scale in the laboratory, and as it is described by Pelouze and Fremy in their *Traité de Chimie*, volume 1, page 1057, nor do I confine my claim to the process above described; but what I do claim as my invention, and desire to secure by Letters Patent, is—

The process herein described for preparing hydrated silica.

I also claim, as a new manufacture, hydrated silica, prepared substantially as herein described and set forth.

I further claim the improvement herein described in the manufacture of artificial stone, marble, paints, cements, and the like, substantially as described.

ANTHONY L. FLEURY.

Witnesses:
 JOHN WHITE,
 ALBERT KERN.